(12) United States Patent
Kachmar

(10) Patent No.: US 8,041,166 B2
(45) Date of Patent: Oct. 18, 2011

(54) FLAT DROP CABLE

(75) Inventor: Wayne M. Kachmar, North Bennington, VT (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 92 days.

(21) Appl. No.: 12/607,748

(22) Filed: Oct. 28, 2009

(65) Prior Publication Data
US 2010/0278493 A1 Nov. 4, 2010

Related U.S. Application Data

(60) Provisional application No. 61/109,041, filed on Oct. 28, 2008.

(51) Int. Cl.
*G02B 6/44* (2006.01)

(52) U.S. Cl. ........ 385/103; 385/100; 385/101; 385/102; 385/104; 385/105; 385/106; 385/107; 385/108; 385/109; 385/110; 385/111; 385/112; 385/113; 385/114

(58) Field of Classification Search ........... 385/100–114
See application file for complete search history.

(56) References Cited

U.S. PATENT DOCUMENTS

| | | |
|---|---|---|
| 3,991,014 A | 11/1976 | Kleinschuster |
| 4,067,852 A | 1/1978 | Calundann |
| 4,083,829 A | 4/1978 | Calundann et al. |
| 4,089,585 A | 5/1978 | Slaughter et al. |
| 4,130,545 A | 12/1978 | Calundann |
| 4,161,470 A | 7/1979 | Calundann |
| 4,199,225 A | 4/1980 | Slaughter et al. |
| 4,304,462 A | 12/1981 | Baba et al. |
| 4,318,842 A | 3/1982 | East et al. |
| 4,359,598 A | 11/1982 | Dey et al. |
| 4,401,361 A * | 8/1983 | Slaughter ............... 385/114 |

(Continued)

FOREIGN PATENT DOCUMENTS

DE 25 13 723 A1 10/1976

(Continued)

OTHER PUBLICATIONS

ADC Spec Sheet, Fiber Optic Cable, Ruggedized Simplex and Duplex Cables, ADC®, Oct. 2005, 4 pages.

(Continued)

*Primary Examiner* — Brian M. Healy
*Assistant Examiner* — Guy Anderson
(74) *Attorney, Agent, or Firm* — Merchant & Gould P.C.

(57) ABSTRACT

The present disclosure relates to a fiber optic cable including an outer jacket having an elongated transverse cross-sectional profile defining a major axis and a minor axis. The transverse cross-sectional profile has a maximum width that extends along the major axis and a maximum thickness that extends along the minor axis. The maximum width of the transverse cross-sectional profile is longer than the maximum thickness of the transverse cross-sectional profile. The outer jacket also defines first and second separate passages that extend through the outer jacket along a lengthwise axis of the outer jacket. The second passage has a transverse cross-sectional profile that is elongated in an orientation extending along the major axis of the outer jacket. The fiber optic cable also includes a plurality of optical fibers positioned within the first passage a tensile strength member positioned within the second passage. The tensile strength member has a highly flexible construction and a transverse cross-sectional profile that is elongated in the orientation extending along the major axis.

21 Claims, 8 Drawing Sheets

U.S. PATENT DOCUMENTS

| | | | |
|---|---|---|---|
| 4,420,220 A | 12/1983 | Dean et al. | |
| 4,468,364 A | 8/1984 | Ide | |
| 4,515,435 A | 5/1985 | Anderson | |
| 4,553,815 A | 11/1985 | Martin | |
| 4,569,420 A | 2/1986 | Pickett et al. | |
| 4,659,174 A | 4/1987 | Ditscheid et al. | |
| 4,715,677 A * | 12/1987 | Saito et al. | 385/114 |
| 4,729,628 A | 3/1988 | Kraft et al. | |
| 4,761,053 A | 8/1988 | Cogelia et al. | |
| 4,807,962 A | 2/1989 | Arroyo et al. | |
| 4,818,060 A | 4/1989 | Arroyo | |
| 4,844,575 A | 7/1989 | Kinard et al. | |
| 4,852,965 A | 8/1989 | Mullin et al. | |
| 4,895,427 A | 1/1990 | Kraft | |
| 4,909,592 A | 3/1990 | Arroyo et al. | |
| 5,015,063 A | 5/1991 | Panuska et al. | |
| 5,125,063 A | 6/1992 | Panuska et al. | |
| 5,157,752 A | 10/1992 | Greveling et al. | |
| 5,214,730 A | 5/1993 | Nagasawa et al. | |
| 5,229,851 A | 7/1993 | Rahman | |
| 5,345,525 A | 9/1994 | Holman et al. | |
| 5,345,526 A | 9/1994 | Blew | |
| 5,448,670 A | 9/1995 | Blew et al. | |
| 5,557,698 A | 9/1996 | Gareis et al. | |
| 5,627,932 A | 5/1997 | Kiel et al. | |
| 5,737,470 A | 4/1998 | Nagano et al. | |
| 5,802,231 A * | 9/1998 | Nagano et al. | 385/114 |
| 5,838,864 A | 11/1998 | Patel et al. | |
| 5,970,196 A | 10/1999 | Greveling et al. | |
| 5,978,536 A | 11/1999 | Brandi et al. | |
| 5,982,966 A | 11/1999 | Bonicel | |
| 6,014,487 A | 1/2000 | Field et al. | |
| 6,088,499 A | 7/2000 | Newton et al. | |
| 6,137,936 A | 10/2000 | Fitz et al. | |
| 6,249,628 B1 | 6/2001 | Rutterman et al. | |
| 6,256,438 B1 | 7/2001 | Gimblet | |
| 6,321,012 B1 | 11/2001 | Shen | |
| 6,347,172 B1 | 2/2002 | Keller et al. | |
| 6,356,690 B1 | 3/2002 | McAlpine et al. | |
| 6,370,303 B1 | 4/2002 | Fitz et al. | |
| 6,434,307 B1 * | 8/2002 | Church | 385/114 |
| 6,493,491 B1 | 12/2002 | Shen et al. | |
| 6,501,888 B2 | 12/2002 | Gimblet et al. | |
| 6,542,674 B1 | 4/2003 | Gimblet | |
| 6,546,175 B1 | 4/2003 | Wagman et al. | |
| 6,621,964 B2 | 9/2003 | Quinn et al. | |
| 6,701,047 B1 | 3/2004 | Rutterman et al. | |
| 6,714,710 B2 | 3/2004 | Gimblet | |
| 6,744,954 B1 | 6/2004 | Tanaka et al. | |
| 6,807,347 B2 | 10/2004 | McAlpine et al. | |
| 6,813,422 B1 | 11/2004 | Krishnamurthy et al. | |
| 6,836,603 B1 | 12/2004 | Bocanegra et al. | |
| 6,901,191 B2 | 5/2005 | Hurley et al. | |
| 6,928,217 B2 | 8/2005 | Mohler et al. | |
| 6,937,801 B2 | 8/2005 | McAlpine et al. | |
| 7,113,680 B2 | 9/2006 | Hurley et al. | |
| 7,197,215 B2 | 3/2007 | Baird et al. | |
| 7,218,821 B2 | 5/2007 | Bocanegra et al. | |
| 7,349,642 B2 | 3/2008 | Tatematsu et al. | |
| 7,379,642 B2 | 5/2008 | Kachmar | |
| 7,458,103 B2 | 12/2008 | Citterio et al. | |
| 7,566,474 B2 | 7/2009 | Kachmar | |
| 7,693,375 B2 | 4/2010 | Freeland et al. | |
| 2006/0159407 A1 | 7/2006 | Kachmar | |
| 2006/0291787 A1 | 12/2006 | Seddon | |
| 2007/0127878 A1 | 6/2007 | de Montmorillon et al. | |
| 2007/0280615 A1 | 12/2007 | de Montmorillon et al. | |
| 2008/0187276 A1 | 8/2008 | Roberts et al. | |
| 2009/0297104 A1 | 12/2009 | Kachmar | |
| 2009/0317039 A1 | 12/2009 | Blazer et al. | |
| 2009/0317047 A1 | 12/2009 | Smith et al. | |
| 2010/0046894 A1 | 2/2010 | Kachmar | |

FOREIGN PATENT DOCUMENTS

| | | |
|---|---|---|
| DE | 20 2007 006 658 U1 | 8/2007 |
| GB | 1 483 845 | 8/1977 |
| GB | 2 096 343 A | 10/1982 |
| GB | 2 296 575 A | 7/1996 |
| WO | WO 96/15466 | 5/1996 |

OTHER PUBLICATIONS

ADC Spec Sheet, Fiber Optic Cable, Tactical Cables, ADC®, Oct. 2005, 4 pages.

Superior Essex, FTTP Tight Buffered Indoor/Outdoor Drop, Series W7, RoHS, Product Bulletin, OSP Fiber Productes, Nov. 2008, 2 pages.

Fiber Optic Cable LCF™ Microcable: Plenum, *ADC Telecommunications, Inc.*, 4 pages (Copyright 2005).

International Search Report and Written Opinion mailed Feb. 1, 2010.

* cited by examiner

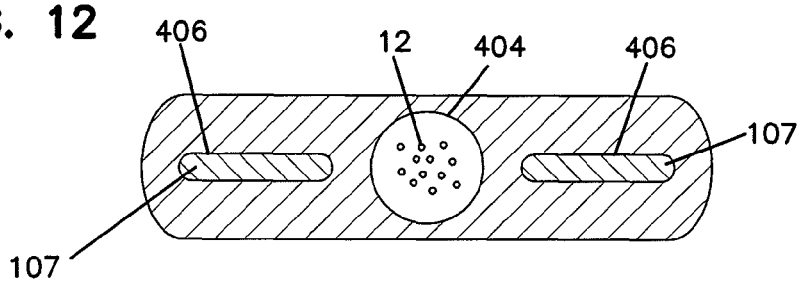
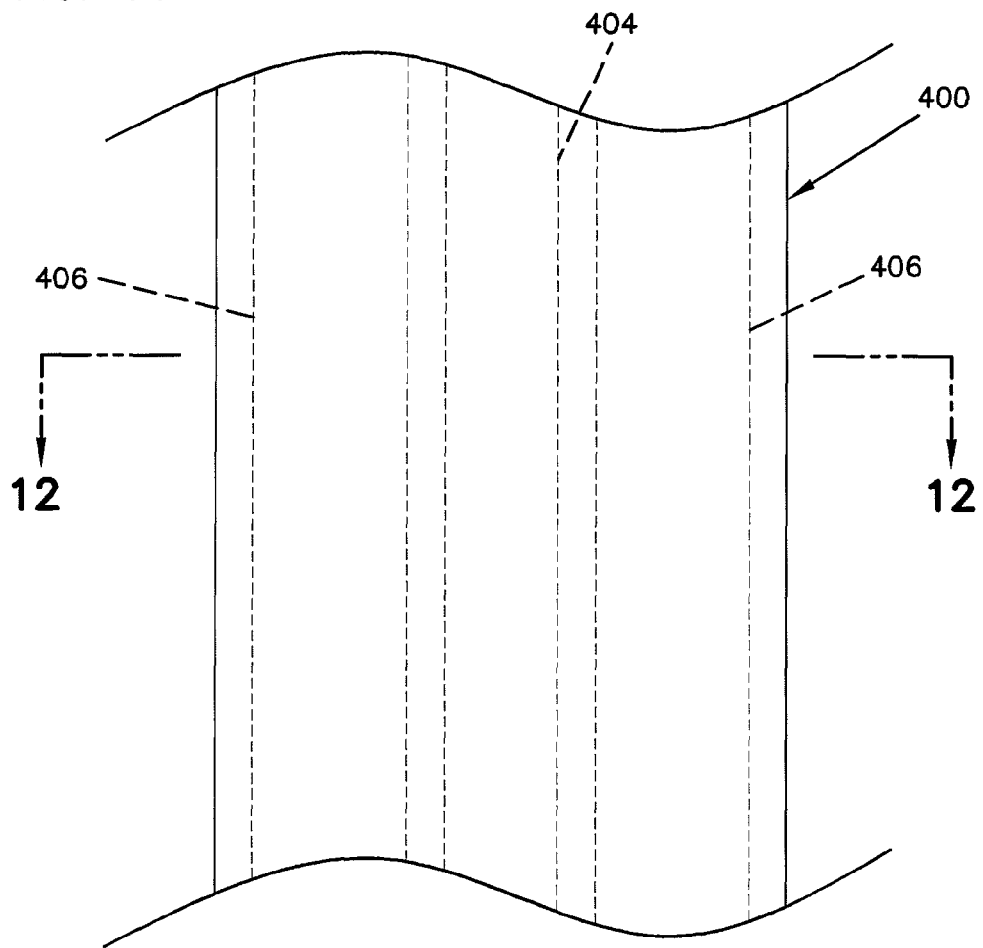

ic cable having features that are examples of aspects in accordance with the principles of the present disclosure.
FLAT DROP CABLE

CROSS REFERENCE TO RELATED APPLICATION

The present application claims the benefit of U.S. Provisional Patent Application Ser. No. 61/109,041, filed Oct. 28, 2008, which application is hereby incorporated by reference in its entirety.

BACKGROUND

A fiber optic cable typically includes: (1) an optical fiber; (2) a buffer layer that surrounds the optical fiber; (3) a plurality of reinforcing members loosely surrounding the buffer layer; and (4) an outer jacket. Optical fibers function to carry optical signals. A typical optical fiber includes an inner core surrounded by a cladding that is protected by a coating. The buffer layer functions to surround and protect the coated optical fibers. Reinforcing members add mechanical reinforcement to fiber optic cables to protect the internal optical fibers against stresses applied to the cables during installation and thereafter. Outer jackets also provide protection against chemical damage.

Drop cables used in fiber optic networks can be constructed having a jacket with a flat transverse profile. Such cables typically include a central buffer tube containing a plurality of optical fibers, and reinforcing members such as rods made of glass reinforced epoxy embedded in the jacket on opposite sides of the buffer tube. U.S. Pat. No. 6,542,674 discloses a drop cable of a type described above. Flat drop cables of the type described above are designed to be quite robust. However, as a result of such cables being strong and robust, such cables are typically quite stiff, inflexible and difficult to handle. Additionally, such cables can be expensive to manufacture.

SUMMARY

The present disclosure relates to a fiber optic cable including an outer jacket having an elongated transverse cross-sectional profile defining a major axis and a minor axis. The transverse cross-sectional profile has a maximum width that extends along the major axis and a maximum thickness that extends along the minor axis. The maximum width of the transverse cross-sectional profile is longer than the maximum thickness of the transverse cross-sectional profile. The outer jacket also defines first and second separate passages that extend through the outer jacket along a lengthwise axis of the outer jacket. The second passage has a transverse cross-sectional profile that is elongated in an orientation extending along the major axis of the outer jacket. The fiber optic cable also includes a plurality of optical fibers positioned within the first passage a tensile strength member positioned within the second passage. The tensile strength member has a highly flexible construction and a transverse cross-sectional profile that is elongated in the orientation extending along the major axis.

A variety of additional aspects will be set forth in the description that follows. These aspects can relate to individual features and to combinations of features. It is to be understood that both the foregoing general description and the following detailed description are exemplary and explanatory only and are not restricted of the broad concepts upon which the embodiments disclosed herein are based.

BRIEF DESCRIPTION OF THE DRAWINGS

FIG. 11 is a top plan view of still another fiber optic cable in accordance with the principles of the present disclosure.

FIG. 12 is a transverse cross-sectional view of the fiber optic cable of FIG. 11 taken along section line 12-12.

DETAILED DESCRIPTION

Figure 1:
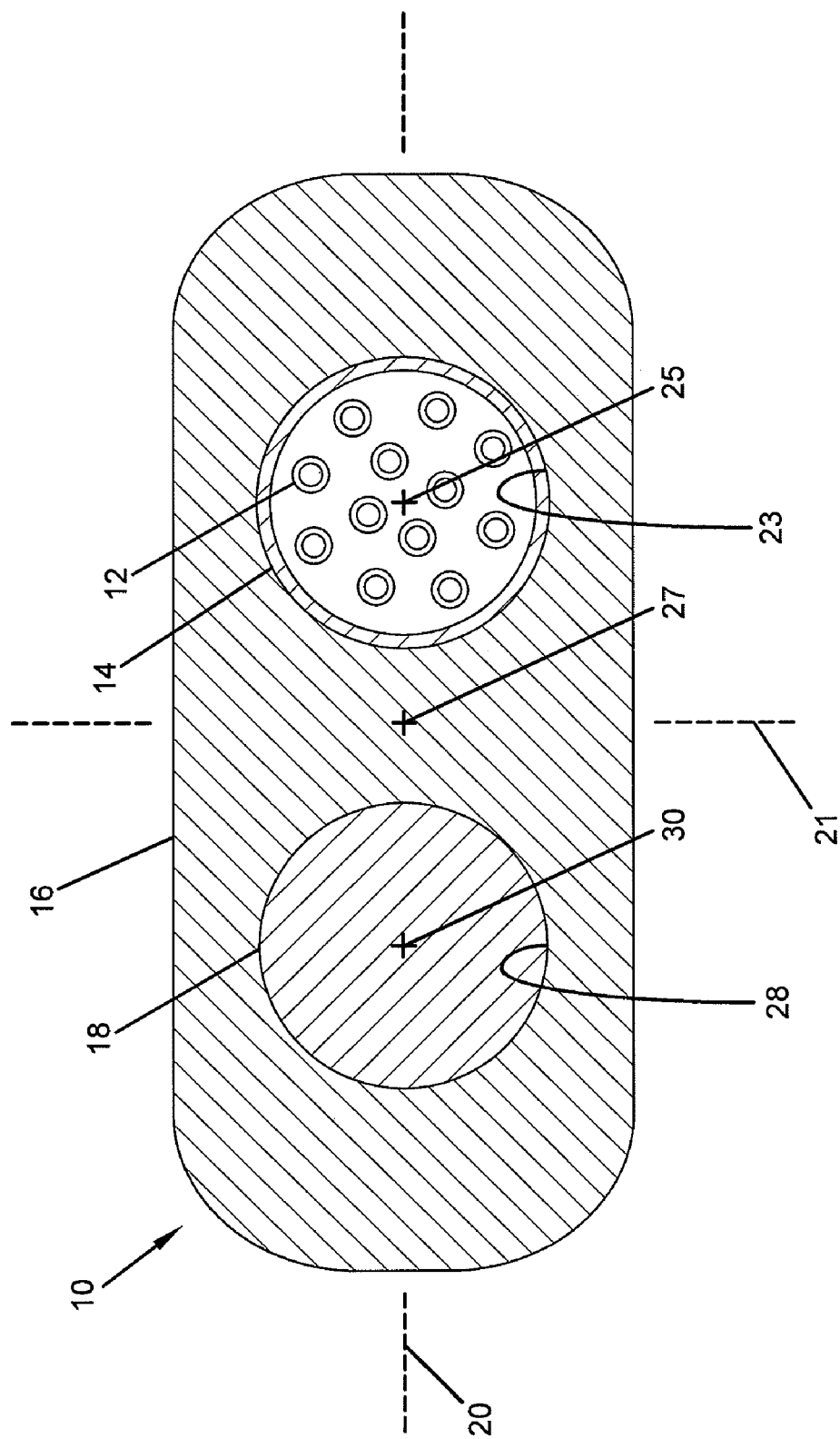
FIG. 1 is a transverse cross-sectional view of a fiber optic cable having features that are examples of aspects in accordance with the principles of the present disclosure.

FIG. 1 shows a fiber optic cable 10 in accordance with the principles of the present disclosure. The fiber optic cable 10 includes at least one optical fiber 12 contained within a buffer tube 14. An outer jacket 16 surrounds the buffer tube 14. A reinforcing member 18 is embedded in the outer jacket 16 to provide the fiber optic cable 10 with axial reinforcement.

Referring still to FIG. 1, the outer jacket 16 has a non-circular outer profile. For example, as shown at FIG. 1, when viewed in transverse cross-section, the outer profile of the outer jacket 16 has a flat generally obround or rectangular shape. The outer jacket 16 is longer along a major axis 20 than along a minor axis 21. The major and minor axes 20, 21 are perpendicular to one another and intersect at a center 27 of the outer jacket 16.

Referring still to FIG. 1, the outer jacket 16 defines a single fiber passage 23 in which the buffer tube 14 is located. As illustrated in the example of FIG. 1, the fiber passage 23 may have a circular profile. The fiber passage 23 has a center 25 that is offset from the center 27 of the outer jacket 16.

The outer jacket 16 also defines a single reinforcing member passage 28 having a center 30 that is also offset from the center 27 of the outer jacket 16. The center 27 of the outer jacket 16 is the geometric center of the outer profile of the outer jacket 16. As illustrated in the example of FIG. 1, the reinforcing member passage 28 may have a circular profile. The center 25 of the fiber passage 23 is located at an opposite side of the minor axis 21 as compared to the center 30 of the reinforcing member passage 28. Consequently, the outer jacket 16 is thicker along the minor axis 21 through the center 27 of the outer jacket 16 than along an axis parallel to the minor axis 21 through the center 25 of the fiber passage 23 or an axis parallel to the minor axis 21 through the center 30 of the reinforcing member passage 28.

Furthermore, because the center 25 of the fiber passage 23 is located at an opposite side of the minor axis 21 as compared to the center 30 of the reinforcing member passage 28, the outer jacket 16 contains no cavities along the minor axis 21 through the center 27 of the outer jacket 16. Because the outer jacket 16 contains no cavities along the minor axis 21 through the center 27 of the outer jacket 16, the outer jacket 16 does not significantly compress the fiber passage 23 or crush the optical fibers 12 when the fiber optic cable 10 is clamped during installation of the fiber optic cable 10. Rather, the portion of the outer jacket 16 along the minor axis 21 through the center 27 of the outer jacket 16 serves to support the fiber passage 23 against compression forces exerted by clamping during installation.

It will be appreciated that the outer jacket 16 can be made of any number of different types of polymeric materials. In one embodiment, the outer jacket 16 is made of a medium density ultra-high molecular weight polyethylene.

The buffer tube 14 can also be made of any number of different polymeric materials. For example, the buffer tube 14 can be made of a polymeric material such as polyvinyl chloride (PVC). Other polymeric materials (e.g., polyethylenes, polyurethanes, polypropylenes, polyvinylidene fluorides, ethylene vinyl acetate, nylon, polyester, or other materials) may also be used.

In certain embodiments, the reinforcing member 18 can include a single reinforcing rod positioned within the reinforcing member passage 28 of the outer jacket 16. In certain embodiments, the single rod can be made of glass fibers imbedded within a resin such as epoxy.

Figure 2:
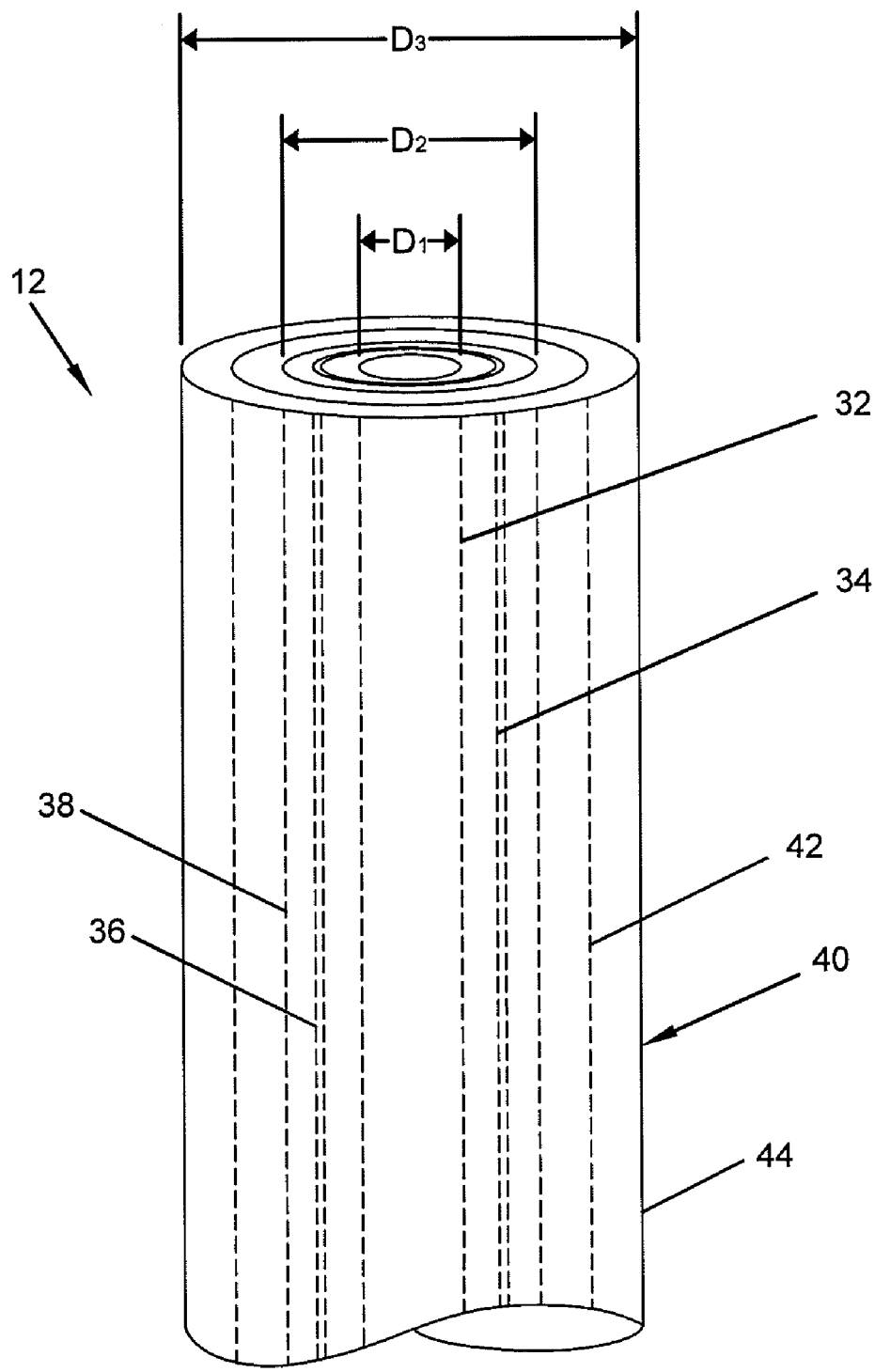
FIG. 2 is a perspective view of an optical fiber suitable for use in the fiber optic cable of FIG. 1.

Referring now to FIGS. 1 and 2, one or more optical fibers 12 can be positioned within the buffer tube 14. In a preferred embodiment, the buffer tube 14 contains at least twelve optical fibers 12. It will be appreciated that the optical fibers 12 can have any number of different types of configurations. In one embodiment, the optical fiber 12 includes a core 32. The core 32 is made of a glass material, such as a silica-based material, having an index of refraction. In the subject embodiment, the core 32 has an outer diameter $D_1$ of less than or equal to about 10 μm.

The core 32 of each optical fiber 12 is surrounded by a first cladding layer 34 that is also made of a glass material, such as a silica based-material. The first cladding layer 34 has an index of refraction that is less than the index of refraction of the core 32. This difference between the index of refraction of the first cladding layer 34 and the index of refraction of the core 32 allows an optical signal that is transmitted through the optical fiber 12 to be confined to the core 32.

A trench layer 36 surrounds the first cladding layer 34. The trench layer 36 has an index of refraction that is less than the index of refraction of the first cladding layer 34. In the subject embodiment, the trench layer 36 is immediately adjacent to the first cladding layer 34.

A second cladding layer 38 surrounds the trench layer 36. The second cladding layer 38 has an index of refraction. In the subject embodiment, the index of refraction of the second cladding layer 38 is about equal to the index of refraction of the first cladding layer 34. The second cladding layer 38 is immediately adjacent to the trench layer 36. In the subject embodiment, the second cladding layer 38 has an outer diameter $D_2$ of less than or equal to 125 μm.

A coating, generally designated 40, surrounds the second cladding layer 38. The coating 40 includes an inner layer 42 and an outer layer 44. In the subject embodiment, the inner layer 42 of the coating 40 is immediately adjacent to the second cladding layer 38 such that the inner layer 42 surrounds the second cladding layer 38. The inner layer 42 is a polymeric material (e.g., polyvinyl chloride, polyethylenes, polyurethanes, polypropylenes, polyvinylidene fluorides, ethylene vinyl acetate, nylon, polyester, or other materials) having a low modulus of elasticity. The low modulus of elasticity of the inner layer 42 functions to protect the optical fiber 12 from microbending.

The outer layer 44 of the coating 40 is a polymeric material having a higher modulus of elasticity than the inner layer 42. In the subject embodiment, the outer layer 44 of the coating 40 is immediately adjacent to the inner layer 42 such that the outer layer 44 surrounds the inner layer 42. The higher modulus of elasticity of the outer layer 44 functions to mechanically protect and retain the shape of optical fiber 12 during handling. In the subject embodiment, the outer layer 44 defines an outer diameter $D_3$ of less than or equal to 500 μm. In another embodiment, the outer layer 44 has an outer diameter $D_3$ of less than or equal to 250 μm.

In the subject embodiment, the optical fiber 12 is manufactured to reduce the sensitivity of the optical fiber 12 to micro or macro-bending (hereinafter referred to as "bend-insensitive"). An exemplary bend insensitive optical fiber has been described in U.S. Pat. Application Publication Nos. 2007/0127878 and 2007/0280615 that are hereby incorporated by reference in their entirety. An exemplary bend-insensitive optical fiber is commercially available from Draka Comteq under the name BendBright XS.

Because the fiber optic cable 10 is reinforced by a single reinforcing member 18 that is offset from the center 27 of the outer jacket 16, the fiber optic cable 10 is provided with an asymmetric reinforcing configuration.

Figure 3:
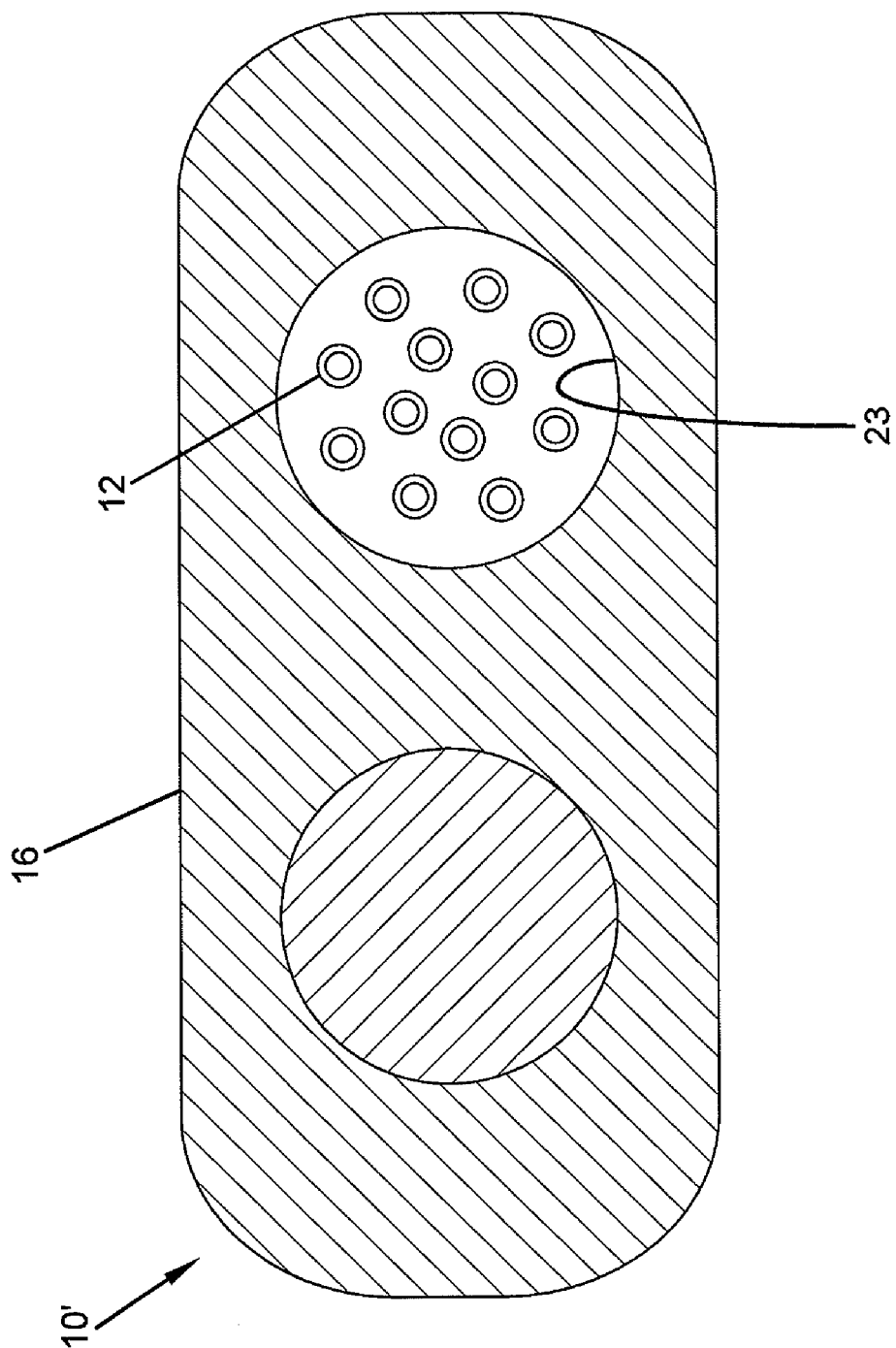
FIG. 3 is a transverse cross-sectional view of another fiber optic cable having features that are examples of aspects in accordance with the principles of the present disclosure.

FIG. 3 shows another fiber optic cable 10' in accordance with the principles of the present disclosure. The fiber optic cable 10' has the same construction as the fiber optic cable 10 except the buffer tube 14 has been eliminated. In this design, the optical fibers 12 are positioned directly within the fiber passage 23 of the outer jacket 16 without any intermediate buffer tubes. In this manner, the portion of the outer jacket 16 defining the fiber passage 23 functions as a buffer tube for containing the optical fibers.

It will be appreciated that the cables of FIGS. 1 and 3 can be used as drop cables in a fiber optic network. For example, the fiber optic cables 10, 10' can be used as drop cables in fiber optic networks such as the networks disclosed in U.S. Provisional Patent Application Ser. No. 61/098,494, entitled "Methods and Systems for Distributing Fiber Optic Telecommunications Services to a Local Area," filed on Sep. 19, 2008 and hereby incorporated by reference in its entirety.

Figure 5:
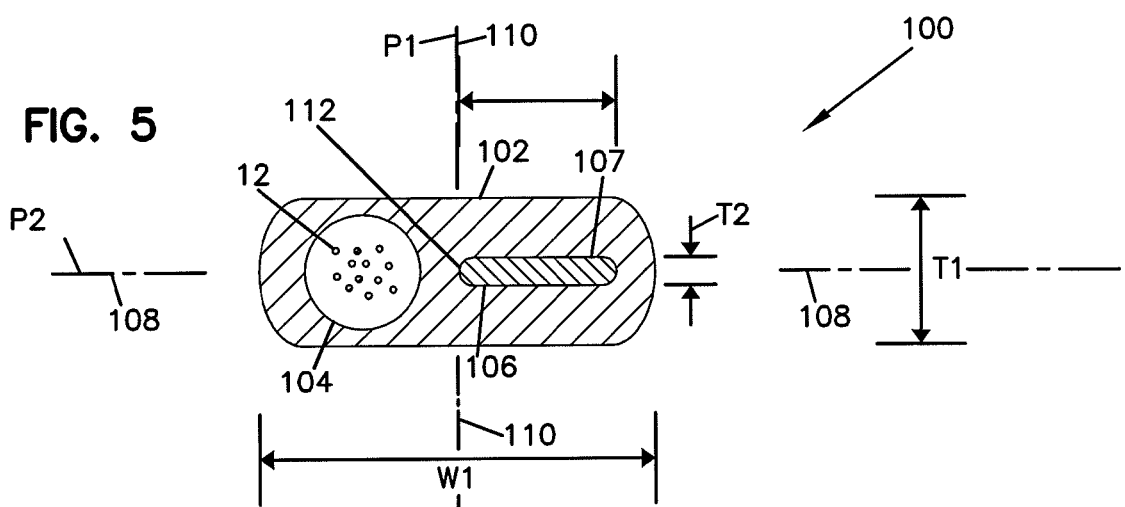
FIG. 5 is a transverse cross-sectional view of the fiber optic cable of FIG. 4 taken along section line 5-5.
Figure 4:
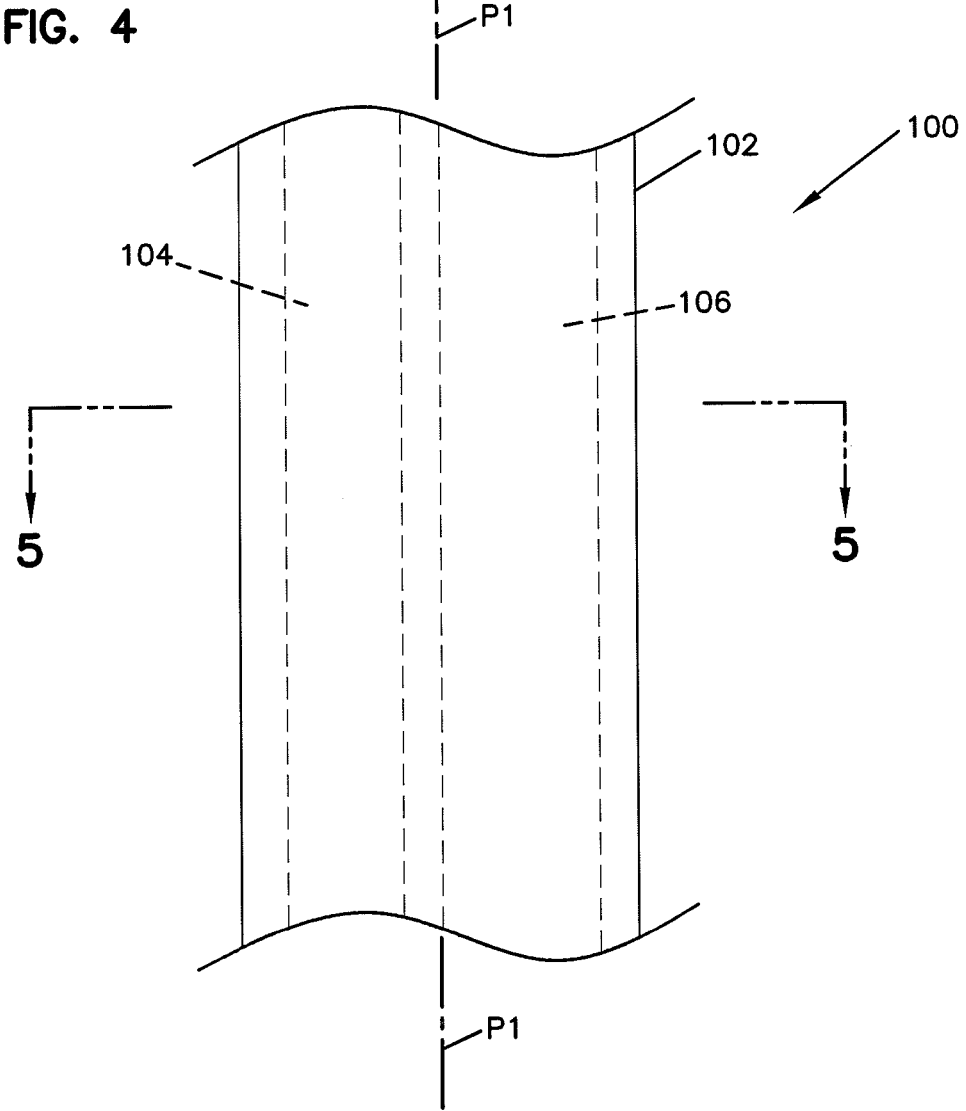
FIG. 4 is a plan view of another fiber optic cable in accordance with the principles of the present disclosure.

FIGS. 4 and 5 depict another fiber optic cable 100 in accordance with the principles of the present disclosure. Generally, the cable 100 includes an outer jacket 102 defining first and second generally parallel passages 104, 106. The cable 100 also includes a plurality of bend insensitive fibers 12 positioned within the first passage 104 and a strength member 107 (i.e., a tensile reinforcing member) positioned within the second passage 106. Such a construction allows the cable 100 to be readily used for applications in which drop cables are normally used and also allows the cable 100 to be wrapped around a cable storage spool having a relatively small diameter without damaging the cable 100.

Referring to FIG. 5, the cable 100 has an elongated transverse cross-sectional profile (e.g., a flattened cross-sectional profile, an oblong cross-sectional profile, an obround cross-sectional profile, etc.) defined by the outer jacket 102. The cable 100 defines a major axis 108 and a minor axis 110. A width W1 of the outer jacket 102 extends along the major axis 108 and a thickness T1 of the outer jacket 102 extends along the minor axis 110. The width W1 is longer than the thickness T1. In certain embodiments, the width W1 is at least 50% longer than the thickness. As depicted in FIG. 5, the width W1 is a maximum width of the outer jacket 102 and the thickness T1 is a maximum thickness of the outer jacket 102.

In the depicted embodiment of FIG. 5, the transverse cross-sectional profile defined by the outer jacket 102 of FIG. 5 is generally rectangular with rounded ends. The major axis 108 and the minor axis 110 intersect perpendicularly at a lengthwise axis 112 of the cable 100.

The construction of the cable 100 allows the cable 100 to be bent more easily along a plane P1 that coincides with the minor axis 110 than along a plane P2 that coincides with the major axis 108. Thus, when the cable 100 is wrapped around a spool or guide, the cable 100 is preferably bent along the plane P1.

As indicated above, the outer jacket 102 defines the elongate transverse cross-sectional profile of the cable 100. The first and second passages 104, 106 are aligned along the major axis 108 of the cable 100. The first passage 104 has a generally circular transverse cross-sectional profile while the second passage 106 has an elongate transverse cross-sectional profile. For example, the second passage 106 is elongated in an orientation that extends along the major axis 108 of the cable 100. In the depicted embodiment, the first passage 104 is not lined with a buffer tube. However, in other embodiments, a buffer tube may be used.

It will be appreciated that the outer jacket 102 of the cable 100 can be shaped through an extrusion process and can be made by any number of different types of polymeric materials. In certain embodiments, the outer jacket 102 can have a construction the resists post-extrusion shrinkage of the outer jacket 102. For example, the outer jacket 102 can include a shrinkage reduction material disposed within a polymeric base material (e.g., polyethylene). U.S. Pat. No. 7,379,642, which is hereby incorporated by reference in its entirety, describes an exemplary use of shrinkage reduction material within the base material of a fiber optic cable jacket.

In one embodiment, the shrinkage reduction material is a liquid crystal polymer (LCP). Examples of liquid crystal polymers suitable for use in fiber-optic cables are described in U.S. Pat. Nos. 3,911,041; 4,067,852; 4,083,829; 4,130,545; 4,161,470; 4,318,842; and 4,468,364 which are hereby incorporated by reference in their entireties. To promote flexibility of the cable 100, the concentration of shrinkage material (e.g. LCP) is relatively small as compared to the base material. In one embodiment, and by way of example only, the shrinkage reduction material constitutes less than about 10% of the total weight of the outer jacket 102. In another embodiment, and by way of example only, the shrinkage reduction material constitutes less than about 5% of the total weight of the outer jacket 102. In another embodiment, the shrinkage reduction material constitutes less than about 2% of the total weight of the outer jacket 102. In another embodiment, shrinkage reduction material constitutes less than about 1.9%, less than about 1.8%, less than 1.7%, less than about 1.6%, less than about 1.5%, less than about 1.4%, less than about 1.3%, less than about 1.2%, less than about 1.1%, or less than about 1.0% of the total weight of the outer jacket 102.

Example base materials for the outer jacket 102 include low-smoke zero halogen materials such as low-smoke zero halogen polyolefin and polycarbon. In other embodiments, the base material can include thermal plastic materials such as polyethylene, polypropylene, ethylene-propylene, copolymers, polystyrene and styrene copolymers, polyvinyl chloride, polyamide (nylon), polyesters such as polyethylene terephthalate, polyetheretherketone, polyphenylene sulfide, polyetherimide, polybutylene terephthalate, as well as other plastic materials. In still other embodiments, the outer jacket 102 can be made of low density, medium density or high density polyethylene materials. Such polyethylene materials can include low density, medium density or high density ultra-high molecular weight polyethylene materials.

The first passage 104 of the outer jacket 102 is sized to receive one or more of the bend insensitive fibers 12. The bend insensitive fibers are preferably unbuffered and in certain embodiments have outer diameters in the range of 230-270 μm. In one embodiment, the first passage 104 is sized to receive at least 12 of the bend insensitive fibers 12. When the fibers 12 are positioned within the first passage 104, it is preferred for the fibers 12 to occupy less than 60% of the total transverse cross-sectional area defined by the first passage 104.

It is preferred for the first passage 104 to be dry and not to be filled with a water-blocking gel. Instead, to prevent water from migrating along the first passage 104, structures such water-swellable fibers, water-swellable tape, or water-swellable yarn can be provided within the passage 104 along with the fibers 12. However, in certain embodiments water-blocking gel may be used.

The strength member 107 of the cable 100 preferably has a transverse cross-sectional profile that matches the transverse cross-sectional profile of the second passage 106. As shown at FIG. 5, the strength member 107 has a transverse cross-sectional width W2 that is greater than a transverse cross-sectional thickness T2 of the strength member 107. The width W2 extends along the major axis 108 of the cable while the thickness T2 extends along the minor axis 110 of the cable 100. In the depicted embodiment, the thickness T2 is bisected by the major axis 108. In certain embodiments, the width W2 of the strength member 107 is at least 50% longer than the thickness T2, or the width W2 of the strength member 107 is at least 75% longer than the thickness T2, or the width W2 of the strength member 107 is at least 100% longer than the thickness T2, or the width W2 of the strength member 107 is at least 200% longer than the thickness T2, or the width W2 of the strength member 107 is at least 300% longer than the thickness T2, or the width W2 of the strength member 107 is at least 400% longer than the thickness T2. As depicted in FIG. 5, the width W2 is a maximum width of the strength member 107 and the thickness T2 is a maximum thickness of the strength member 107.

In certain embodiments, the strength member 107 is bonded to the outer jacket 102. The bonding between the strength member 107 and the outer jacket 102 can be chemical bonding or thermal bonding. In one embodiment, the strength member 107 may be coated with or otherwise provided with a material having bonding characteristics (e.g., ethylene acetate) to bond the strength member 107 to the outer jacket 102.

The strength member 107 preferably has a construction that is highly flexible and highly strong in tension. For example, in certain embodiments, the strength member 107 provides the vast majority of the tensile load capacity of the cable 100. For example, in one embodiment, the strength member 107 carries at least 95% of a 150 pound tensile load applied to the cable 100 in a direction along the lengthwise axis 112. In one embodiment, the strength member 107 can carry a 150 pound tensile load applied in an orientation extending along a central longitudinal axis of the strength member 107 without undergoing meaningful deterioration of the tensile properties of the strength member 107. In another embodiment, the strength member 107 can carry a 200 pound tensile load applied in an orientation extending along the central longitudinal axis of the strength member 107 without undergoing meaningful deterioration in its tensile properties. In still another embodiment, the strength member 107 can carry a 300 pound tensile load applied in an orientation that extends along the central longitudinal axis of the strength member 107 without experiencing meaningful deterioration of its tensile properties.

Figure 9:
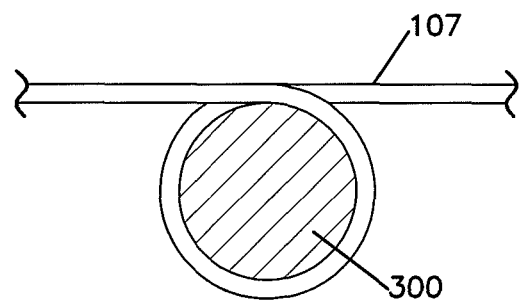
FIG. 9 is an end view of a test system for testing the flexibility of the strength members of the fiber optic cables of FIGS. 4, 5, 7 and 8.
Figure 10:
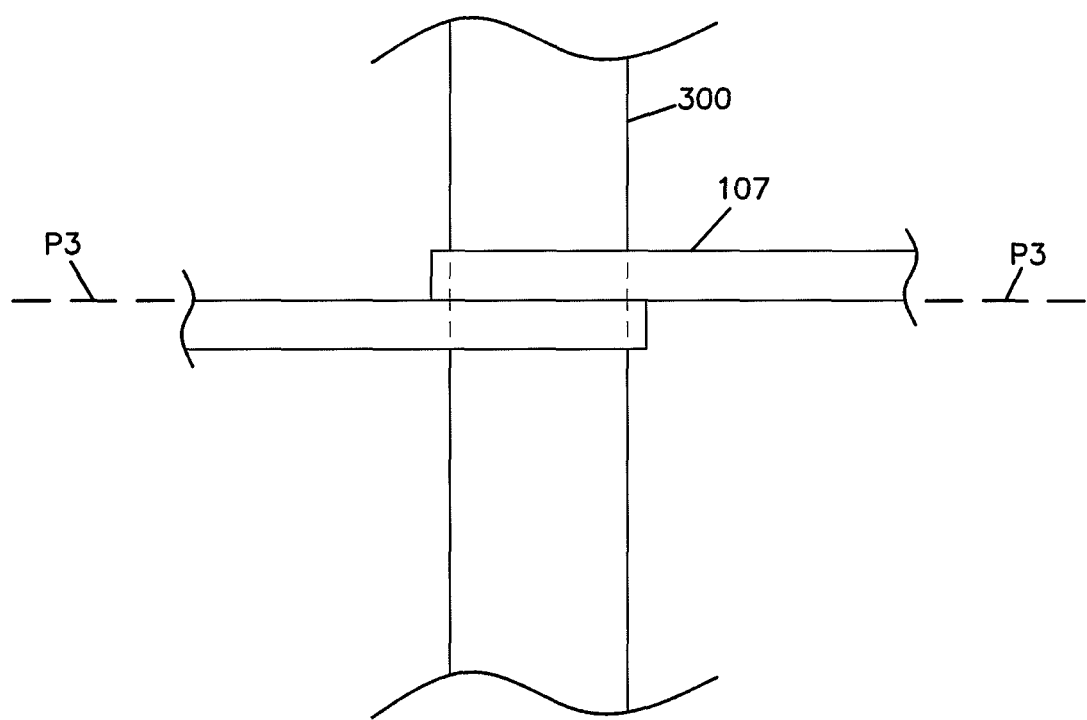
FIG. 10 is a top view of the test system of FIG. 9.

It is preferred for the strength member 107 to be able to provide the tensile strengths described above while concurrently being highly flexible. In determining the tensile strength of the cable 102, tensile load is applied to the cable 102 in a direction that extends along the lengthwise axis 112 of the cable 100. Similarly, to determine the tensile strength of the strength member 107, tensile load is applied to the strength member 107 in a direction that extends along central longitudinal axis 114 of the strength member 107. In one embodiment, a strength member 107 having tensile strength characteristics as described above also has a flexibility that allows the strength member 107 to be wrapped at least 360 degrees around a mandrel 300 (see FIGS. 9 and 10) having a 10 millimeter outer diameter for one hour without undergoing/experiencing meaningful deterioration/degradation of the tensile strength properties of the strength member 107. As shown at FIGS. 9 and 10, the 360 degree wrap is aligned generally along a single plane P3 (i.e., the 360 degree wrap does not form a helix having an extended axial length). In this way, the strength member 107 conforms to the outer diameter of the mandrel and generally forms a circle having an inner diameter of 10 millimeters. This test can be referred to as the "mandrel wrap" test. In certain embodiments, the strength member 107 maintains at least 95% of its pre-mandrel wrap test tensile strength after having been subjected to the mandrel wrap test. In certain embodiments, the strength member 107 does not "broom stick" when subjected to the mandrel wrap test described. As used herein, the term "broom stick" means to have reinforcing elements of the strength member visually separate from the main body of the strength member 107. In certain embodiments, the strength member 107 does not generate any audible cracking when exposed to the mandrel wrap test.

In certain embodiments, the strength member 107 is formed by a generally flat layer of reinforcing elements (e.g., fibers or yarns such as aramid fibers or yarns) embedded or otherwise integrated within a binder to form a flat reinforcing structure (e.g., a structure such as a sheet-like structure, a film-like structure, or a tape-like structure). In one example embodiment, the binder is a polymeric material such ethylene acetate acrylite (e.g., UV-cured, etc.), silicon (e.g., RTV, etc.), polyester films (e.g., biaxially oriented polyethylene terephthalate polyester film, etc.), and polyisobutylene. In other example instances, the binder may be a matrix material, an adhesive material, a finish material, or another type of material that binds, couples or otherwise mechanically links together reinforcing elements.

In other embodiments, the strength member 107 can have a glass reinforced polymer (GRP) construction. The glass reinforced polymer can include a polymer base material reinforced by a plurality of glass fibers such as E-glass, S-glass or other types of glass fiber. The polymer used in the glass reinforced polymer is preferably relatively soft and flexible after curing. For example, in one embodiment, the polymer has a Shore A hardness less than 50 after curing. In other embodiments, the polymer has a Shore A hardness less than 46 after curing. In certain other embodiments, the polymer has a Shore A hardness in the range of about 34-46.

In one embodiment, the strength member 107 can have a width of about 0.085 inches and a thickness of about 0.045 inches. In another embodiment, such a strength member may have a width of about 0.125 inches and a thickness of about 0.030 inches. In still further embodiments, the strength member has a thickness in the range of 0.020-0.040 inches, or in the range of 0.010-0.040 inches, or in the range of 0.025-0.035 inches. Of course, other dimensions could be used as well. In additional embodiments, the strength member may have a width in the range of 0.070-0.150 inches. Of course, other sizes could be used as well.

In certain embodiments, the strength member 107 preferably does not provide the cable 100 with meaningful resistance to compression loading in an orientation extending along the lengthwise axis 112. For example, in certain embodiments, the outer jacket 102 provides greater resistance to compression than the strength member 107 in an orientation extending along the lengthwise axis 112. Thus, in certain embodiments, the reinforcing member 107 does not provide the cable 100 with meaningful compressive reinforcement in an orientation that extends along the lengthwise axis 112. Rather, resistance to shrinkage or other compression of the cable 100 along the lengthwise axis 112 can be provided by the outer jacket 102 itself through the provision of the shrinkage reduction material within the base material of the outer jacket 102. In this type of embodiment, when a compressive load is applied to the cable 100 along the lengthwise axis 112, a vast majority of the compressive load will be carried by the outer jacket 102 as compared to the strength member 107.

As depicted in FIG. 5, the fibers 12 are loose within the first passage 104. In other embodiments, the fibers 12 within the first passage 104 can be surrounded and grouped together by separating members that can separate the fibers 12 from the jacket material defining the first passage 104. Such separating can assist in preventing the fibers 12 from contacting the extrusion die or extrusion tip during extrusion of the outer jacket 102 over the fibers 12. In certain embodiments, first and second sets of separating members 120a, 120b can be contra-helically served about the group of fibers 12. For example, in the depicted embodiment of FIG. 6, the first set of separating members 120a is disposed about the fibers 12 in a generally right-handed helical wrap configuration while the second set of separating members 120b is disposed about the optical fibers 12 in a generally left-handed helical wrap configuration. In certain embodiments, the separating members 120a, 120b can have helical wrap angles α less than 20 degrees or less than 15 degrees. In certain embodiments, the separating members can be yarns. In one embodiment, the separating members are formed by aramid yarn. In certain embodiments, water swellable material can be coated on or otherwise incorporated into the binding members.

Figure 6:
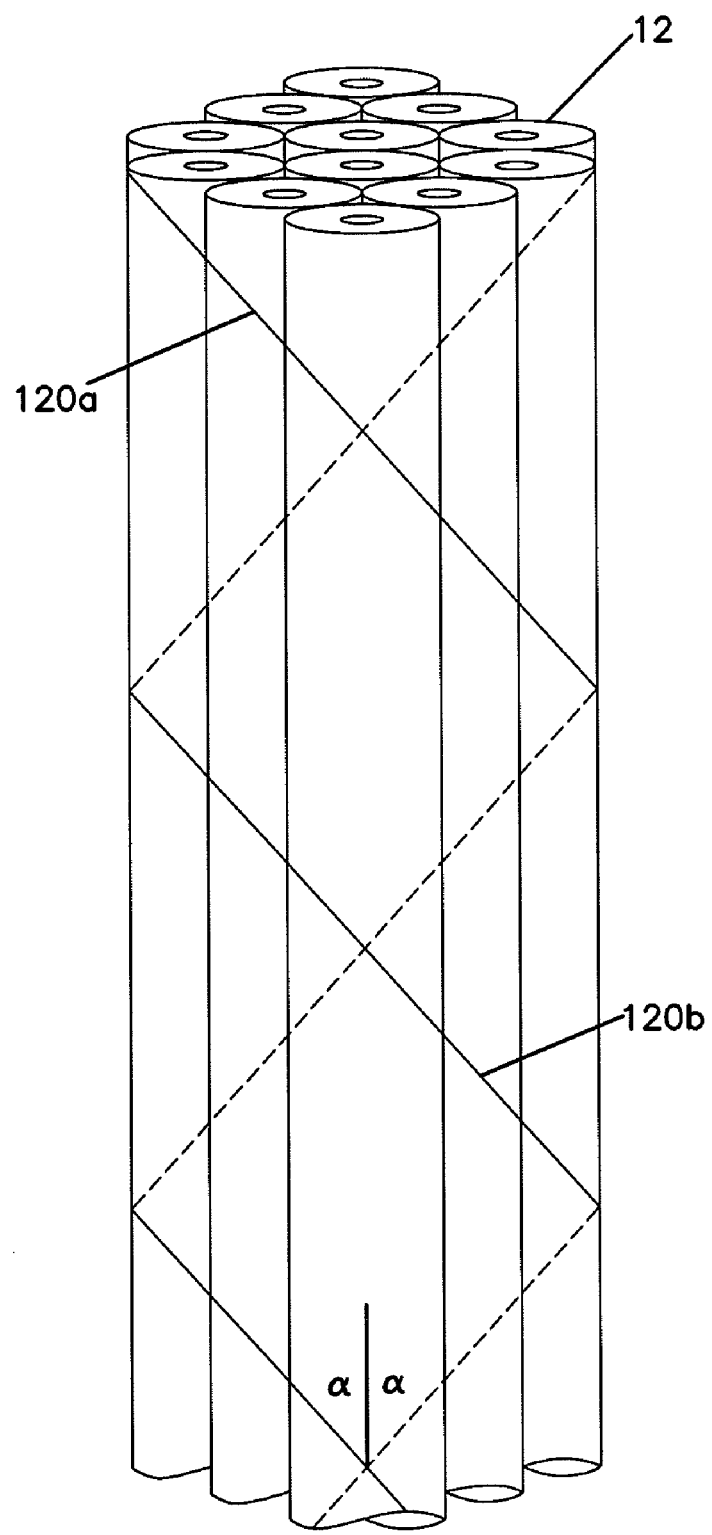
FIG. 6 is a perspective view of contrahelical separating members that can be used to group together the optical fibers of the fiber optic cable of FIGS. 4 and 5 and can also be used to separate the optical fibers from the cable jacket material enclosing the fibers.

In the depicted embodiment of FIG. 6, the contra-helical serve of separating members extends around the entire group of optical fibers 12. In other embodiments, contra-helical serving can be used to divide the fibers 12 into separate groups. For example, the fibers 12 can be separated into three groups of 4 optical fibers 12 with contra-helical serving provided around each of the groups of 4 fibers 12.

Figure 8:
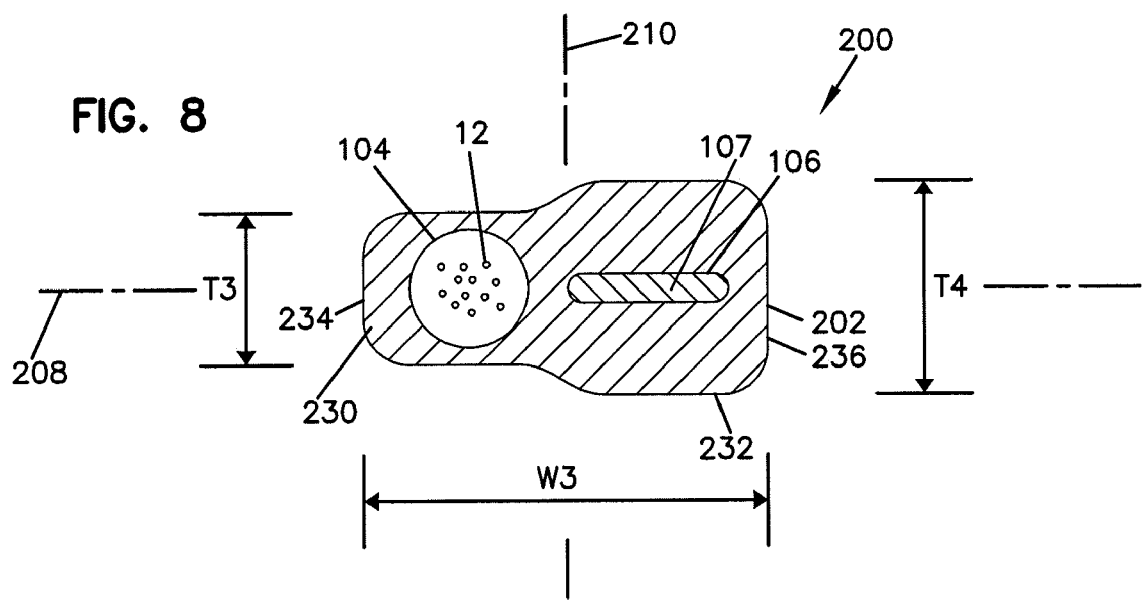
FIG. 8 is a transverse cross-sectional view of the fiber optic cable of FIG. 7 taken along section line 8-8.
Figure 7:
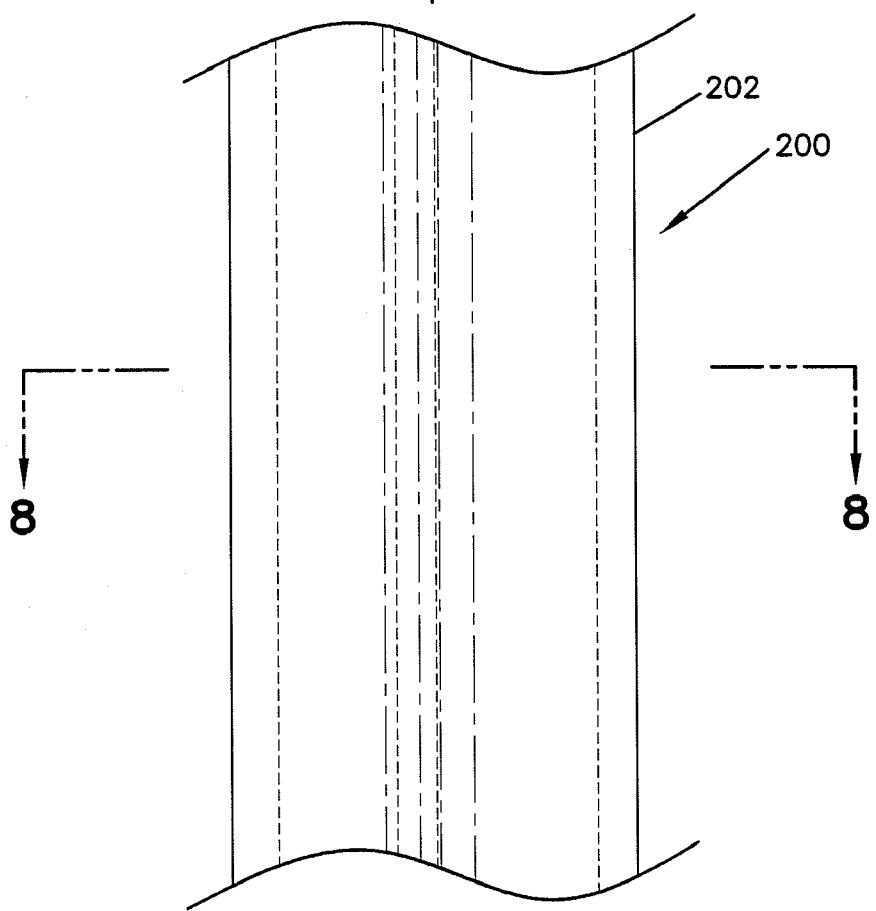
FIG. 7 is a plan view of a further fiber optic cable in accordance with the principles of the present disclosure.

FIGS. 7 and 8 depict another cable 200 in accordance with the principles of the present disclosure. The cable 200 includes many of the same components as the as the cable 100 (e.g., the strength member 107, the optical fibers 12, the passages 104, 106). However, the cable 200 includes an outer jacket 202 having a transverse cross-sectional profile that has been modified to include a variable thickness (e.g., a dual thickness) to improve the crush-resistance of the cable 200. Crush resistance can be significant when the cable is used with a cable clamp such as a "P-clamp."

Referring to FIG. 8, the outer jacket 202 of the cable 200 has an elongated transverse cross-sectional profile. The cable 200 defines a major axis 208 and a minor axis 210. A width W3 of the outer jacket 202 extends along the major axis 208 and thicknesses T3, T4 of the outer jacket 202 extend along the minor axis 210. The thickness T3 is smaller than the thickness T4, and the width W3 is greater than the thickness T4. The thickness T3 is defined by a first portion 230 of the jacket 202 in which the first passage 104 containing the optical fibers 12 is formed. The thickness T4 is defined by a second portion 232 of the jacket 202 in which the second passage 106 containing the strength member 107 is formed. In the depicted embodiment, the first portion 230 is positioned at or defines a first end 234 of the transverse cross-sectional profile of the cable 200 and the second portion 231 is positioned at or defines an opposite second end 236 of the transverse cross-sectional profile of the cable 200. When viewed in transverse cross-section, the thickness T3 coincides with a center of the first passage 104 and the thickness T4 coincides with a center of the second passage 106. When the cable 200 is compressed in an orientation that extends along the minor axis 210 (e.g., with a cable clamp), the increased thickness T4 provided by the second portion 232 of the jacket 202 carries most of the compressive load thereby preventing the first passage 104 from being deformed. In this way, the fibers 12 within the first passage 104 are prevented from being damaged by the compressive action.

While most of the drawings of the present disclosure show cables having asymmetrical reinforcing configurations in which strength members are provided only on one side of a passage containing optical fibers, it will be appreciated that aspects of the present disclosure can be use for other cables as well. For example, aspects of the present disclosure can be used for a flat drop cable 400 (see FIGS. 11 and 12) having a central passage 404 for containing fibers 12 and two passages 406 on opposite sides of the central passage 404 for containing strength members 107.

The above specification provides examples of how certain inventive aspects may be put into practice. It will be appreciated that the inventive aspects can be practiced in other ways than those specifically shown and described herein without departing from the spirit and scope of the inventive aspects of the present disclosure.

What is claimed is:

1. A fiber optic cable comprising:
   an outer jacket having an elongated transverse cross-sectional profile defining a major axis and a minor axis, the transverse cross-sectional profile having a maximum width that extends along the major axis and a maximum thickness that extends along the minor axis, the maximum width of the transverse cross-sectional profile being longer than the maximum thickness of the transverse cross-sectional profile, the outer jacket also defining first and second separate passages that extend through the outer jacket along a lengthwise axis of the outer jacket, the second passage having a transverse cross-sectional profile that is elongated in an orientation extending along the major axis of the outer jacket;
   a plurality of optical fibers positioned within the first passage; and
   a tensile strength member positioned within the second passage, the tensile strength member having a transverse cross-sectional profile that is elongated in the orientation extending along the major axis, the tensile strength member being sufficiently flexible to be wrapped in a circle having a 10 millimeter inner diameter for one hour without undergoing meaningful deterioration in tensile strength.

2. The fiber optic cable of claim 1, wherein the first passage has a generally round transverse cross-sectional profile.

3. The fiber optic cable of claim 1, wherein the first passage is not lined with a buffer tube.

4. The fiber optic cable of claim 3, wherein two separating members are contrahelically served about the optical fibers to separate the optical fibers from a portion of the outer jacket that defines the first passage.

5. The fiber optic cable of claim 1, wherein the strength member is bonded to the outer jacket.

6. The fiber optic cable of claim 5, wherein the strength member is bonded to the outer jacket with an adhesive material.

7. The fiber optic cable of claim 6, wherein the adhesive material includes ethylene acetate.

8. The fiber optic cable of claim 1, wherein the optical fibers include bend insensitive optical fibers.

9. The fiber optic cable of claim 1, wherein the first and second passages are aligned along the major axis.

10. The fiber optic cable of claim 9, wherein the tensile strength member provides asymmetrical tensile reinforcement to the fiber optic cable about the minor axis.

11. The fiber optic cable of claim 1, wherein the tensile strength member provides less compressive reinforcement than the outer jacket in an orientation that extends along the lengthwise axis.

12. The fiber optic cable of claim 1, wherein the tensile strength member can carry a tensile load of at least 300 pounds.

13. The fiber optic cable of claim 1, wherein the tensile strength member can carry a tensile load of at least 150 pounds.

14. The fiber optic cable of claim 12, wherein the tensile strength member retains at least 95 percent of its pre-wrapped tensile strength after having been wrapped in the circle having the 10 millimeter inner diameter for one hour.

15. The fiber optic cable of claim 13, wherein the tensile strength member retains at least 95 percent of its pre-wrapped tensile strength after having been wrapped in the circle having the 10 millimeter inner diameter for one hour.

16. The fiber optic cable of claim 1, wherein the outer jacket includes a polymeric base material and a shrinkage reduction material disposed within the polymeric base material.

17. The fiber optic cable of claim 16, wherein the shrinkage reduction material includes a liquid crystal polymer.

18. The fiber optic cable of claim 1, wherein the first and second passages are aligned along the major axis, wherein the first passage has a circular transverse cross-sectional profile, wherein the first passage is not lined with a buffer tube, wherein the tensile strength member is bonded to the outer jacket, and wherein the outer jacket includes a polymeric base material and a liquid crystal polymer disposed within the base material.

19. The fiber optic cable of claim 1, wherein when the outer jacket is viewed in transverse cross-section, the outer jacket has a first portion in which the first passage is defined and a second portion in which the second passage is defined, wherein the first portion defines a first thickness and the second portion defines a second thickness, wherein the second thickness is the maximum thickness of the outer jacket, and wherein the second thickness is thicker than the first thickness.

20. The fiber optic cable of claim 19, wherein the first thickness coincides with a center of the first passage and the second thickness coincides with a center of the second passage.

21. A fiber optic cable comprising:

an outer jacket having an elongated transverse cross-sectional profile defining a major axis and a minor axis, the transverse cross-sectional profile having a maximum width that extends along the major axis and a maximum thickness that extends along the minor axis, the maximum width of the transverse cross-sectional profile being longer than the maximum thickness of the transverse cross-sectional profile, the outer jacket also defining first and second separate passages that extend through the outer jacket along a lengthwise axis of the outer jacket, the second passage having a transverse cross-sectional profile that is elongated in an orientation extending along the major axis of the outer jacket;

a plurality of optical fibers positioned within the first passage; and a tensile strength member positioned within the second passage, the tensile strength member having a transverse cross-sectional profile that is elongated in the orientation extending along the major axis, the tensile strength member provides less compressive reinforcement than the outer jacket in an orientation that extends along the lengthwise axis.

* * * * *